US012781716B2

(12) United States Patent
Ui et al.

(10) Patent No.: US 12,781,716 B2
(45) Date of Patent: Nov. 3, 2026

(54) GEOTHERMAL POWER GENERATION SYSTEM

(71) Applicant: FUJI ELECTRIC CO., LTD., Kanagawa (JP)

(72) Inventors: Shinya Ui, Tokyo (JP); Azusa Ozawa, Tokyo (JP); Taku Fukumura, Kanagawa (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 19/247,403

(22) Filed: Jun. 24, 2025

(65) Prior Publication Data

US 2025/0369425 A1 Dec. 4, 2025

Related U.S. Application Data

(63) Continuation of application No. PCT/JP2024/024562, filed on Jul. 8, 2024.

(30) Foreign Application Priority Data

Jul. 19, 2023 (JP) ................................ 2023-117850

(51) Int. Cl.
*F03G 4/00* (2006.01)

(52) U.S. Cl.
CPC ............. *F03G 4/069* (2021.08); *F03G 4/029* (2021.08); *F03G 4/072* (2021.08)

(58) Field of Classification Search
CPC .......... F03G 4/069; F03G 4/029; F03G 4/072; Y02E 10/10

(Continued)

(56) References Cited

U.S. PATENT DOCUMENTS 4,192,854 A * 3/1980 Harvey .................. C10K 1/108 423/220
4,512,155 A * 4/1985 Sheinbaum ............. E21B 43/40 417/115

(Continued)

FOREIGN PATENT DOCUMENTS

JP S54-124801 9/1979
JP S57-157074 9/1982

(Continued)

OTHER PUBLICATIONS

International Search Report mailed on Sep. 17, 2024 with respect to PCT/JP2024/024562.

(Continued)

*Primary Examiner* — Hoang M Nguyen
(74) *Attorney, Agent, or Firm* — IPUSA, PLLC

(57) ABSTRACT

A geothermal power generation system includes: gas-liquid separator; power generator; retention tank; re-injection line; re-injection pump; chemical agent injection port in the re-injection line between the retention tank and the re-injection pump; first chemical agent adding device to inject a chemical agent into the chemical agent injection port; branching section in the re-injection line on a downstream side relative to the re-injection pump as well as on a vertically upper side of the re-injection well, and to branch a flow of geothermal brine; first liquid analyzer; scale-piece collector; dissolving agent adding device; and controller to switch between an injection operation and injection stoppage of the chemical agent by the first chemical agent adding device and to switch between an injection operation and injection stoppage of the dissolving agent by the dissolving agent adding device, based on an analysis result of the first liquid analyzer.

16 Claims, 8 Drawing Sheets

(58) Field of Classification Search
USPC .............................................. 60/641.2–641.4
See application file for complete search history.

(56) References Cited

U.S. PATENT DOCUMENTS

| | | | |
|---|---|---|---|
| 5,598,706 A | 2/1997 | Bronicki et al. | |
| 2015/0121867 A1 | 5/2015 | Kubota et al. | |
| 2024/0199941 A1* | 6/2024 | Wada | C02F 5/00 |
| 2025/0172128 A1* | 5/2025 | Haruyama | F24T 50/00 |

FOREIGN PATENT DOCUMENTS

| | | |
|---|---|---|
| JP | S60-209672 | 10/1985 |
| JP | H02-136573 | 5/1990 |
| JP | 2011-251210 | 12/2011 |
| JP | 2013-230432 | 11/2013 |
| JP | 2015-090147 | 5/2015 |

OTHER PUBLICATIONS

Written Opinion of The International Searching Authority mailed on Sep. 17, 2024 with respect to PCT/JP2024/024562.

* cited by examiner

GEOTHERMAL POWER GENERATION SYSTEM

CROSS-REFERENCE TO RELATED APPLICATIONS

This application is a continuation application of International Application No. PCT/JP2024/024562, filed on Jul. 8, 2024, and designated the U.S., which is based upon and claims priority to Japanese Patent Application No. 2023-117850, filed on Jul. 19, 2023, the entire contents of which are incorporated herein by reference.

BACKGROUND

1. Field of the Invention

The present disclosure relates to a geothermal power generation system.

2. Description of the Related Art

The geothermal power generation system extracts a high-temperature geothermal fluid (geothermal brine and geothermal steam) from a production well, and generates power by using the geothermal brine or the geothermal steam separated from the geothermal fluid. The geothermal fluid extracted from the production well contains more calcium, dissolved silica, etc., than well water and river water.

Calcium and dissolved silica in the geothermal brine collected from the production well are concentrated by decompression in the geothermal power generation system, and they are cooled as they flow through piping, and their solubility decreases. Then, when the calcium, the dissolved silica, and the like in the geothermal brine are supersaturated, they polymerize into calcium carbonate and amorphous silica, and precipitate as scale. Adhesion of the scale inside the piping is an issue in the geothermal power generation system, because the scale adhered to an inner wall or the like of the piping may cause an issue such as blockage of the piping.

In particular, in a geothermal power generation system, the scale tends to adhere to a re-injection line for returning the geothermal brine to a re-injection well, and it is required to thoroughly wash away the scale adhered to the re-injection line. For example, in the geothermal power generation system described in Japanese Laid-Open Patent Application No. 2015-90147, hydrogen peroxide water is supplied as an oxidizing agent to separated geothermal brine on a downstream side relative to a brackish water separator to prevent scale adhesion of silica components in a geothermal brine system.

SUMMARY

An embodiment of the present disclosure is a geothermal power generation system including: a gas-liquid separator configured to separate geothermal brine and geothermal steam from a geothermal fluid spouted out from a production well; a power generator configured to generate power by using the geothermal brine or the geothermal steam separated by the gas-liquid separator as a heat source; a retention tank configured to store the geothermal brine from which heat has been recovered by the power generator; a re-injection line configured to connect an outlet portion of the retention tank and the re-injection well; a re-injection pump provided in the re-injection line and configured to return the geothermal brine discharged from the retention tank to the re-injection well; a chemical agent injection port provided in the re-injection line between the retention tank and the re-injection pump; a first chemical agent adding device configured to inject a chemical agent into the chemical agent injection port; a branching section provided in the re-injection line on the downstream side relative to the re-injection pump as well as on an upper side in a vertical direction of the re-injection well, and configured to branch a flow of the geothermal brine; a first liquid analyzer connected vertically upward from the branching section; a scale-piece collector connected horizontally from the branching section and provided with a residue input port, a dissolving agent injection port, and a residue discharge port; a dissolving agent adding device configured to inject a dissolving agent into the dissolving agent injection port; and a controller configured to switch between an injection operation and injection stoppage of the chemical agent performed by the first chemical agent adding device and to switch between an injection operation and injection stoppage of the dissolving agent performed by the dissolving agent adding device, based on an analysis result of the first liquid analyzer.

DETAILED DESCRIPTION OF THE PRESENT DISCLOSURE

In a geothermal power generation system, since a re-injection line is usually arranged over a long distance, a detergent supplied on an upstream side of the re-injection line is diluted as it approaches toward the downstream side, such that cleaning away of the scale adhered inside the piping on the downstream side becomes insufficient and poor cleaning occurs.

A geothermal power generation system capable of sufficiently removing the scale of the re-injection line is provided.

Embodiments of the present disclosure will be described in the following with reference to the drawings. First, an embodiment of a geothermal power generation system 100 in which a re-injection line L100 is cleaned while an ordinary operation (power generation) is stopped will be described.

Figure 1:
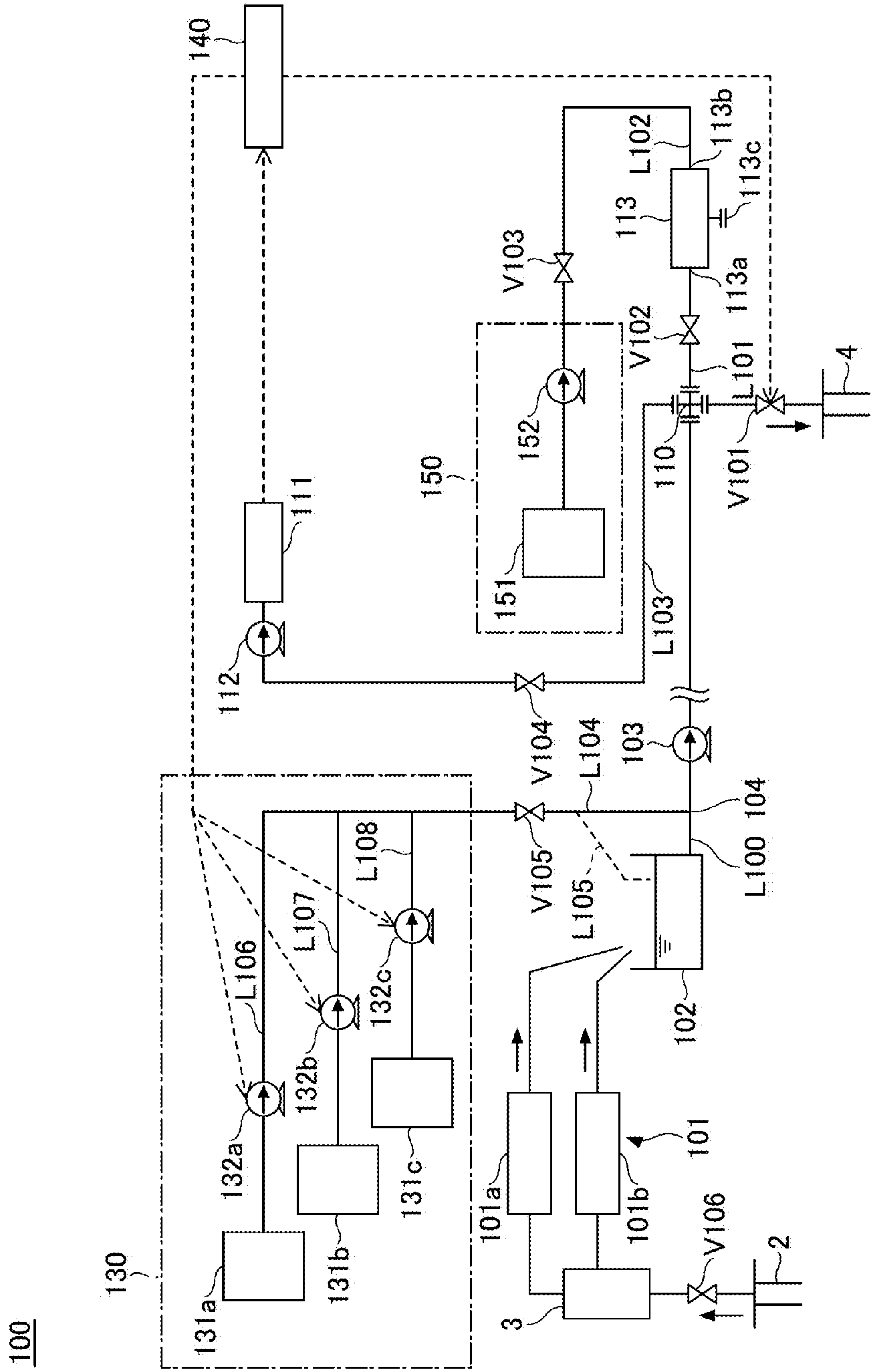
FIG. 1 is a schematic configurational diagram illustrating a geothermal power generation system according to an embodiment.

FIG. 1 is a schematic configurational diagram illustrating the geothermal power generation system 100 according to an embodiment. As illustrated in FIG. 1, the geothermal power generation system 100 includes a gas-liquid separator 3, a power generator 101, a retention tank 102, the re-injection line L100, a re-injection pump 103, a chemical agent injection port 104, a first chemical agent adding device 130, and a controller 140. In FIG. 1, arrows indicate a fluid flow.

In the geothermal power generation system 100, a geothermal fluid collected from a production well 2 is sent to the gas-liquid separator 3. The gas-liquid separator 3 separates the geothermal brine and the geothermal steam from the geothermal fluid ejected from the production well 2. The geothermal brine and the geothermal steam separated by the gas-liquid separator 3 are sent to the power generator 101 via piping, and the power generator 101 uses the geothermal brine or the geothermal steam separated by the gas-liquid separator 3 as a heat source to generate power. The geothermal brine to which the heat is recovered by the power generator 101 is introduced into the retention tank 102 via the piping.

In the example as illustrated in FIG. 1, the geothermal steam separated by the gas-liquid separator 3 is sent to a flash power generator 101*a*, and the flash power generator 101*a* uses the geothermal steam separated by the gas-liquid separator 3 as the heat source to generate power. The geothermal brine separated by the gas-liquid separator 3 is sent to a binary power generator 101*b*, and the binary power generator 101*b* uses the geothermal brine separated by the gas-liquid separator 3 as the heat source to generate power.

The power generator 101 is not particularly limited, and may include the flash power generator 101*a* and the binary power generator 101*b*, and may include either the flash power generator 101*a* or the binary power generator 101*b*.

The flash power generator 101*a* includes a turbine configured to rotate upon being supplied with the geothermal steam separated by the gas-liquid separator 3, a power generator connected to the turbine, a condenser configured to condense the geothermal steam discharged from the turbine, a cooling tower configured to cool the condensate condensed by the condenser, and the like. The binary power generator 101*b* includes a medium evaporator configured to evaporate a low-boiling-point heat medium by exchanging heat, the turbine that rotates upon being supplied with a vaporized heat medium, the power generator, the medium condenser, and the like.

The retention tank 102 stores the geothermal brine from which heat has been recovered by the power generator 101. Then, a polymerization reaction of silica in the geothermal brine proceeds, and the geothermal brine is retained until the silica-based insoluble components are sufficiently aggregated and precipitated.

The re-injection line L100 is a line connecting the outlet portion of the retention tank 102 and a re-injection well 4.

The re-injection pump 103 is provided in the re-injection line L100, and returns the geothermal brine discharged from the retention tank 102 to the re-injection well 4. The geothermal brine discharged from the retention tank 102 is returned to the re-injection well 4 via the re-injection line L100 by the re-injection pump 103.

The chemical agent injection port 104 is provided in the re-injection line L100 between the retention tank 102 and the re-injection pump 103.

The first chemical agent adding device 130 is a device configured to inject a chemical agent into the chemical agent injection port, and may include a plurality of chemical agent tanks 131*a*, 131*b*, and 131*c* that respectively contain a chemical agent, and a plurality of chemical agent injection pumps 132*a*, 132*b*, and 132*c*, each of which is connected to the corresponding one of the plurality of chemical agent tanks 131*a*, 131*b*, and 131*c*, each configured to discharge the chemical agent toward the chemical agent injection port 104. The number of the chemical agent tanks 131*a*, 131*b*, and 131*c* is three in the example as illustrated in FIG. 1, but is not limited thereto, and may be selected according to the number of the chemical agents to be used, and may be four or more. The number of the chemical agent injection pumps 132*a*, 132*b*, and 132*c* may be selected according to the number of the chemical agent tanks 131*a*, 131*b*, and 131*c*.

Each of the plurality of chemical agent tanks 131*a*, 131*b*, and 131*c* may contain one chemical agent selected from a group including a tracer reagent, a detergent, and a corrosive agent having a corrosive effect on the metal included in the re-injection line L100. For example, the chemical agent tank 131*a* contains a tracer reagent, the chemical agent tank 131*b* contains a detergent, and the chemical agent tank 131*c* contains a corrosive agent. Hereinafter, the chemical agent injection pump connected to the chemical agent tank 131*a* containing a tracer reagent may be referred to as a tracer reagent injection pump 132*a*, the chemical agent injection pump connected to the chemical agent tank 131*b* containing a detergent may be referred to as a detergent injection pump 132*b*, and the chemical agent injection pump connected to the chemical agent tank 131*c* containing a corrosive agent may be referred to as a corrosive agent injection pump 132*c*.

The tracer reagent is used to confirm that the detergent has arrived at the downstream side of the re-injection line L100. Examples of the tracer reagent include, for example, halogens such as iodine and bromine; radioactive isotopes such as iodine 131, bromine 82, and tritium; aromatic sulfonate such as sodium benzoate, sodium toluenesulfonate, sodium xylene sulfonate, sodium benzenesulfonate, 1-naphthalenesulfonic acid, 1,5-naphthalenedisulfonic acid; fluorescent dyes such as fluorescein sodium, rhodamine WT, 2,6,8-naphthylamine disulfonic acid (amino G acid); metal indicator; benzoic acid; and the like. Among these, the tracer reagent is preferably the aromatic sulfonate.

The detergent is used to remove and clean the scale adhered inside the piping of the re-injection line L100. The detergent may include, for example, one or more chemical agents selected from a group including an acidic agent, a basic agent, a chelating agent, a hydrogen peroxide agent, a dispersant, and a catalase agent.

The acidic agent can be used to dissolve calcium-based scales. Examples of the acidic agent include sulfuric acid, hydrochloric acid, acetic acid, citric acid, and the like. The basic agents can be used to dissolve silica-based scales (amorphous silica). Examples of the basic agents include sodium hydroxide, potassium hydroxide, ammonium salts, and the like. The chelating agents can be used to perform masking of dissolved metals in the geothermal brine and suppress waste of other detergents before using other detergents under pH control. Examples of the chelating agents include ethylenediaminetetraacetic acid (EDTA), nitrilotriacetic acid (NTA), hvdroxyethylenediaminetriacetic acid (HEDTA), diethylenetriaminepentaacetic acid (DTPA), trimethanolamine, sodium gluconate, and the like. The hydrogen peroxide agent can be used to dissolve ooze. Examples of the hydrogen peroxide agent include a hydrogen peroxide solution. The dispersant can be used to disperse and peel off the scales adhered to the inner wall of the piping. Examples of the dispersant include sodium polyacrylate and various surfactants. The catalase agent can be used to decompose the hydrogen peroxide agent remaining in the geothermal brine after using the hydrogen peroxide agent.

The corrosive agent is a chemical agent that flows through the re-injection line L100 after cleaning, elutes the metal contained in the piping of the re-injection line L100, and is used to determine a cleaning state by the concentration of eluted metal ions. The corrosive agent may be, for example, any acid selected from a group including a sulfuric acid, a hydrochloric acid, an acetic acid, and a citric acid.

The geothermal power generation system 100 may include a fourth pipe L104 that is connected to the chemical agent injection port 104 of the re-injection line L100, and a fifth valve V105 that is provided in the fourth pipe L104 and configured to open and close a flow path of the fourth pipe L104. The first chemical agent adding device 130 may include a sixth pipe L106 that branches from the fourth pipe L104 and is connected to an outlet port of the chemical agent injection pump 132*a*, a seventh pipe L107 that branches from the fourth pipe L104 and is connected to an outlet port of the chemical agent injection pump 132*b*, and an eighth pipe L108 that branches from the fourth pipe L104 and is connected to an outlet port of the chemical agent injection pump 132*c*.

The geothermal power generation system 100 may include a temporary fifth pipe L105 that branches from the fourth pipe L104 and extends to the inlet of the retention tank 102, depending on the distance between the retention tank 102 and the re-injection pump 103. In this case, the chemical supplied from the first chemical agent adding device 130 is supplied to the re-injection line L100 from the outlet portion of the retention tank 102 together with the geothermal brine in the retention tank 102.

The geothermal power generation system 100 includes a branching section 110 that is provided in the re-injection line L100 on the downstream side relative to the re-injection pump 103 as well as above the re-injection well 4 in the vertical direction and configured to branch the flow of the geothermal brine, a first liquid analyzer 111 that is connected vertically upward from the branching section 110, and a scale-piece collector 113 that is connected in a horizontal direction from the branching section 110. The branching section 110 branches the flow of the geothermal brine into four directions, and may be, for example, a four-way valve. The geothermal power generation system 100 may include a first valve V101 (re-injection valve) provided in the re-injection line L100 between the branching section 110 and the re-injection well 4 and configured to open and close a flow path between the branching section 110 and the re-injection well 4.

The first liquid analyzer 111 is connected to a third pipe L103 branched from the branching section 110. The first liquid analyzer 111 is configured to analyze and detect components contained in the fluid. The first liquid analyzer 111 detects at least a tracer reagent. The first liquid analyzer 111 also measures pH, a dielectric constant, or a dissolved ion concentration. The first liquid analyzer ill may be, for example, a high-performance liquid chromatograph.

The geothermal power generation system 100 may include a liquid feed pump 112 which is provided in the third pipe L103 and is configured to discharge the fluid flowing through the re-injection line L100 toward an inlet of the first liquid analyzer 111, and a fourth valve V104 which is provided in the third pipe L103 on the upstream side relative to the liquid feed pump 112 and is configured to open and close a flow path of the third pipe L103.

The scale-piece collector 113 includes a residue input port 113*a*, a dissolving agent injection port 113*b*, and a residue discharge port 113*c*, and is configured to collect scale pieces flowing through the re-injection line L100 after cleaning of the re-injection line L100 is completed. The geothermal power generation system 100 may include a first pipe L101 connecting the branching section 110 and the residue input port 113*a*, and a second valve V102 provided in the first pipe L101 and configured to open and close a flow path of the first pipe L101.

The geothermal power generation system 100 may include a dissolving agent adding device 150 configured to inject a dissolving agent into the dissolving agent injection port 113*b* of the scale-piece collector 113. The dissolving agent adding device 150 may include a dissolving agent tank 151 containing the dissolving agent, and a dissolving agent injection pump 152 connected to the dissolving agent tank 151 and configured to discharge the dissolving agent toward the dissolving agent injection port 113*b*. The dissolving agent is a chemical agent for dissolving the scale collected in the scale-piece collector 113, and can be any chemical agent selected from a group including, for example, a basic agent, a fluoride agent, and an acidic agent.

As the basic agent and the acidic agent, the same chemical agent as the above-described detergent can be used. Examples of the fluoride agent include hydrofluoric acid, hexafluorophosphate, ammonium fluoride, and the like.

The geothermal power generation system 100 may include a second pipe L102 connecting the dissolving agent injection port 113*b* and an outlet port of the dissolving agent injection pump 152, and a third valve V103 provided in the second pipe L102 and configured to open and close a flow path of the second pipe L102.

Based on an analysis result of the first liquid analyzer 111, the controller 140 switches between an injection operation and injection stoppage of the chemical agent performed by the first chemical agent adding device 130 and an injection operation and injection stoppage of the dissolving agent performed by the dissolving agent adding device 150. Specifically, based on the analysis result of the first liquid analyzer 111, the controller 140 controls the plurality of chemical agent injection pumps 132*a*, 132*b*, and 132*c*, the dissolving agent injection pump 152, and the first valve V101.

Figure 2:
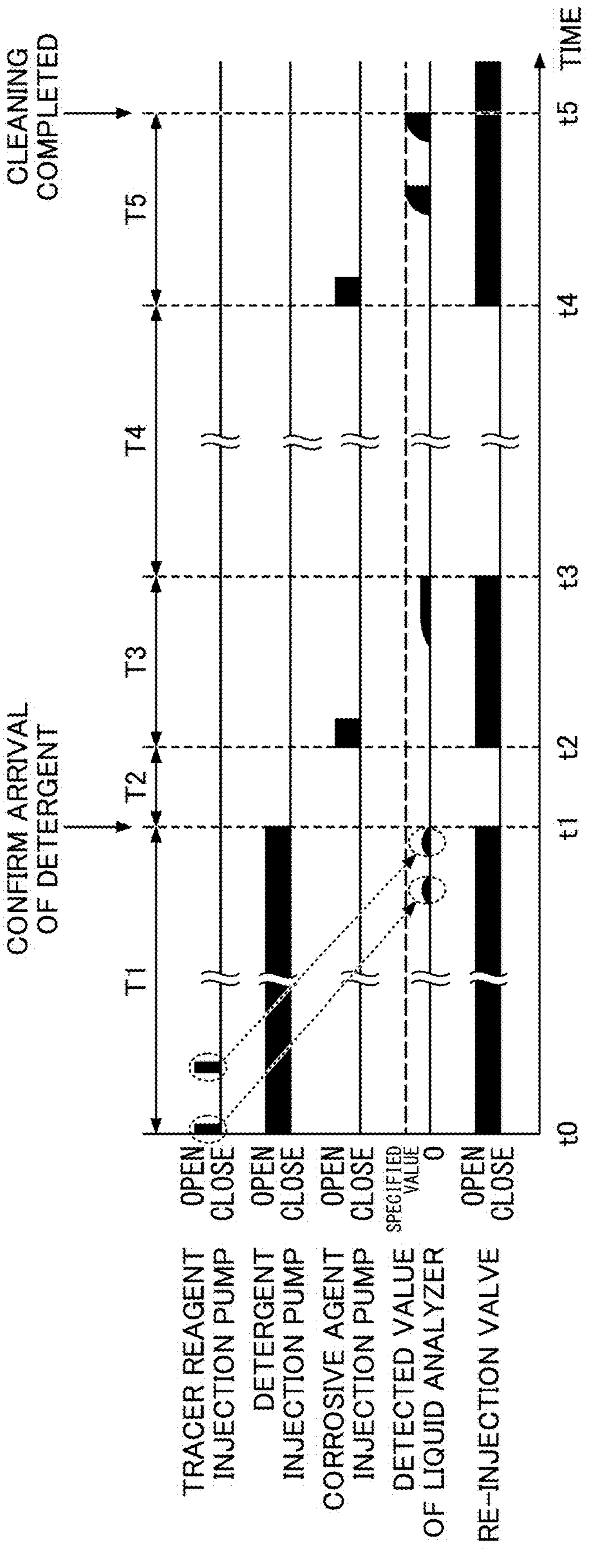
FIG. 2 is a time chart illustrating operation of cleaning in the geothermal power generation system according to the embodiment.

FIG. 2 is a time chart illustrating the operation of cleaning in the geothermal power generation system 100 according to one embodiment. The controller 140 may execute the cleaning operation by supplying a detergent with the first chemical agent adding device 130 and supplying a tracer reagent for two or more times at an interval of 5 minutes or more, and after the first liquid analyzer 111 detects the tracer reagent as many times as the number of times the tracer reagent has been supplied, stopping the supply of the detergent, and closing the first valve V101 (re-injection valve).

As illustrated in FIG. 2, at time t0, with the first valve V101 (re-injection valve) open, the controller 140 sends a command to the tracer reagent injection pump 132*a* to discharge the tracer reagent at two or more supply times at the interval of 5 minutes or more, and sends a command to the detergent injection pump 132*b* to continuously discharge the detergent. After receiving a signal from the first liquid analyzer 111 indicating that the tracer reagent has been detected the same number of times as the number of times the tracer reagent has been supplied, the controller 140 sends a command, at time t1, to stop the discharge of the detergent to the detergent injection pump 132*b* and at the same time sends a command to the first valve V101 to close the first valve V101. By receiving the signal indicating that the tracer reagent has been detected the same number of times as the number of times the tracer reagent has been supplied, the controller 140 can confirm that the detergent has arrived at the downstream side of the re-injection line L100. A period T1 is the length of time required for the detergent to arrive at the downstream side of the re-injection line L100.

After 2 to 3 hours have elapsed from the time when the first valve V101 (re-injection valve) is closed, the controller 140 opens the first valve V101 and, with the first valve V101 open, causes a corrosive agent to be supplied by the first chemical agent adding device 130, and determines a cleaning state based on the concentration of metal ions detected by the first liquid analyzer 111.

At time t2, after 2 to 3 hours (period T2) have elapsed from the time t1 when the detergent injection pump 132*b* is stopped and the first valve V101 (re-injection valve) is closed, the controller 140 sends a command to the corrosive agent injection pump 132*c* to discharge a corrosive agent and at the same time sends a command to the first valve V101 to open the first valve V101. The period T2 is the length of time required for sufficiently bringing the detergent into contact with the inner wall of the piping of the re-injection line L100. After receiving a measured value of the concentration of metal ions from the first liquid analyzer 111, the controller 140 determines the cleaning state at time t3 after a period T3 has elapsed. The period T3 is the length of time required for confirming the cleaning state.

As the cleaning proceeds, the inner wall of the pipe is exposed and the metal of the pipe dissolves into the fluid, and thus the concentration of metal ions contained in the fluid increases. The concentration of metal ions detected by the first liquid analyzer 111 may be the concentration of iron ions. For example, the controller 140 may determine that the cleaning is complete when the concentration of iron ions reaches 100 ppm. The analysis result of the analysis by the first liquid analyzer Ill may be a dielectric constant.

When the concentration of metal ions detected by the first liquid analyzer 111 is less than a specified value, the controller 140 determines that the cleaning is not complete, executes the cleaning operation of the periods T1 to T3 again, and repeats the cleaning operation of the periods T1 to T3 until the concentration of metal ions detected by the first liquid analyzer 111 reaches the specified value. A period T4 is the length of time required for repeating the cleaning operation of the periods T1 to T3. Since the time chart illustrating the cleaning operation of the period T4 is the same as that for the periods T1 to T3, its description is omitted from FIG. 2.

When the concentration of metal ions detected by the first liquid analyzer 111 reaches the specified value, the controller 140 determines that the cleaning operation is completed at time t5, terminates the cleaning operation, and returns to the ordinary operation. A period T5, which is a period from time t4 to the time t5, is a final period including the period T3 for confirming the cleaning state among a plurality of confirmation times.

When the concentration of the metal ions detected by the first liquid analyzer 111 reaches the specified value and it is determined that the cleaning is completed, the controller 140 causes the geothermal brine to flow into the residue input port 113*a*, causes the scale-piece collector 113 to collect the scale pieces, and then causes the dissolving agent adding device 150 to inject the dissolving agent into the dissolving agent injection port 113*b*, and closes the second valve V102 and the third valve V103. Specifically, when the concentration of the metal ions detected by the first liquid analyzer 111 reaches the specified value and it is determined that the cleaning is completed, the controller 140 preferably performs control to open the second valve V102 and causes the geothermal brine to flow into the residue input port 113*a* for at least 1 week. As a result, the geothermal power generation system 100 can sufficiently collect the scale pieces flowing through the re-injection line L100 after the cleaning, in the scale-piece collector 113. Next, the controller 140 causes the dissolving agent adding device 150 to inject the dissolving agent into the dissolving agent injection port 113*b*, and when the dissolving agent is a basic agent, causes the second valve V102 and the third valve V103 to close when the pH of the fluid in the scale-piece collector 113 reaches a specified value. The pH of the fluid in the scale-piece collector 113 can be detected by, for example, a pH meter (not illustrated) provided in the scale-piece collector 113, and the controller 140 receives a measured pH value from the pH meter.

Since the temperature of the scale-piece collector 113 is maintained high by the sensible heat of the re-injection well 4, the effect of the dissolving agent in the scale-piece collector 113 can be enhanced and the dissolution of the scale pieces can be promoted. From the viewpoint of promoting the dissolution of the scale pieces, it is preferable to arrange the scale-piece collector 113 to maintain the temperature in the scale-piece collector 113 at 80° C. or higher.

The controller 140 controls the flow of the fluid containing the dissolved scale pieces in the scale-piece collector 113 to the re-injection well 4 via the first pipe L101 by closing the second valve V102 and the third valve V103, leaving the second valve V102 and the third valve V103 closed for 48 hours or more, and then opening the second valve V102. Specifically, the controller 140 controls application of pressure inside the scale-piece collector 113 by a pressurizing device (not illustrated) to push back the geothermal brine that flows in from the residue input port 113*a* through the opened second valve V102, and to send the fluid containing the dissolved scale pieces in the scale-piece collector 113 to the re-injection well 4 through the first pipe L101.

The controller 140 controls the discharge of the scale pieces, rock fragments, iron rust, and the like remaining in the scale-piece collector 113 to the outside through the residue discharge port 113*c*.

The controller 140 may also control the re-injection pump 103, the liquid feed pump 112, the fourth valve V104, the fifth valve V105, and a sixth valve V106.

Figure 3:
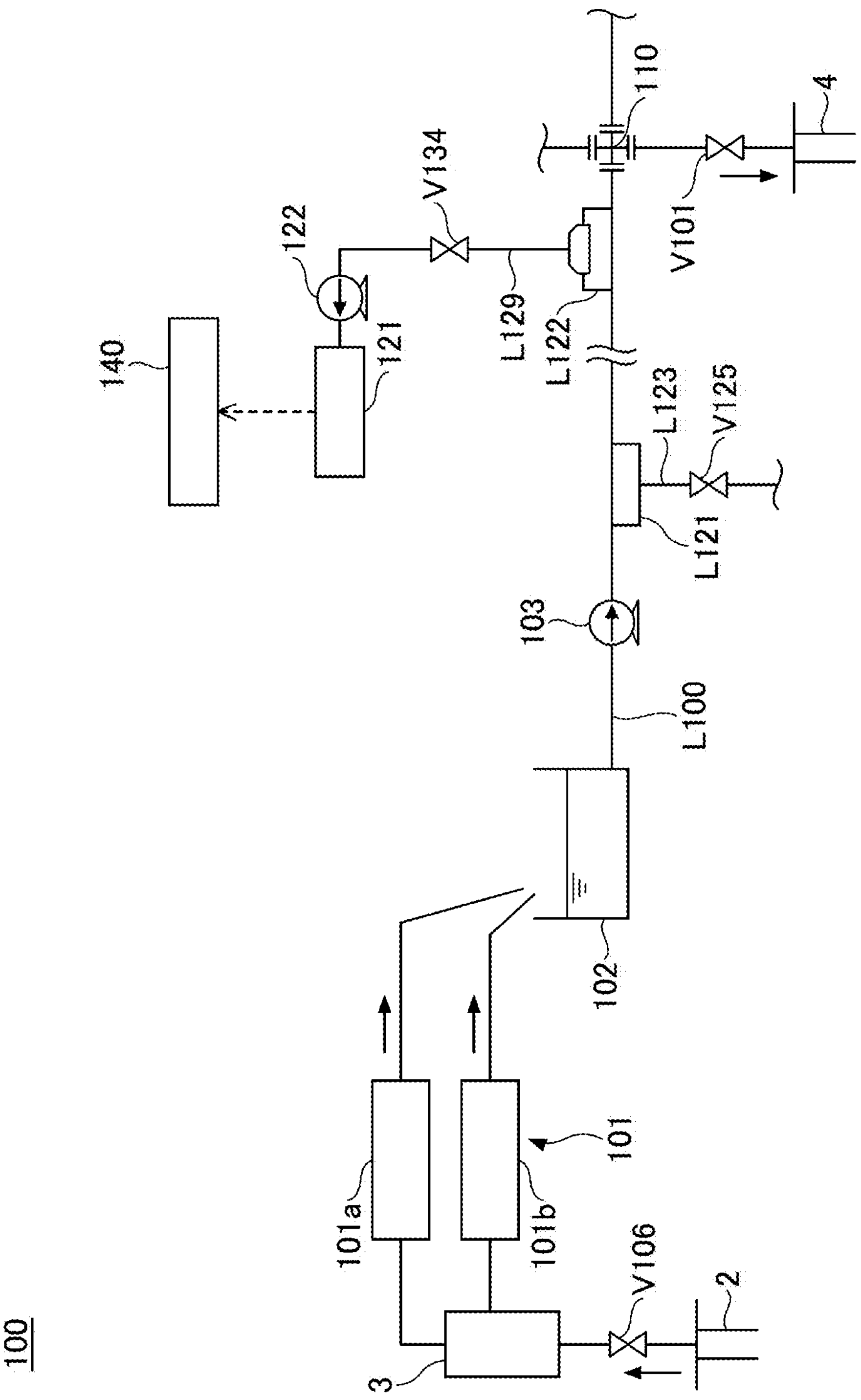
FIG. 3 is a schematic configurational diagram illustrating another example of the geothermal power generation system according to one embodiment.
Figure 4:
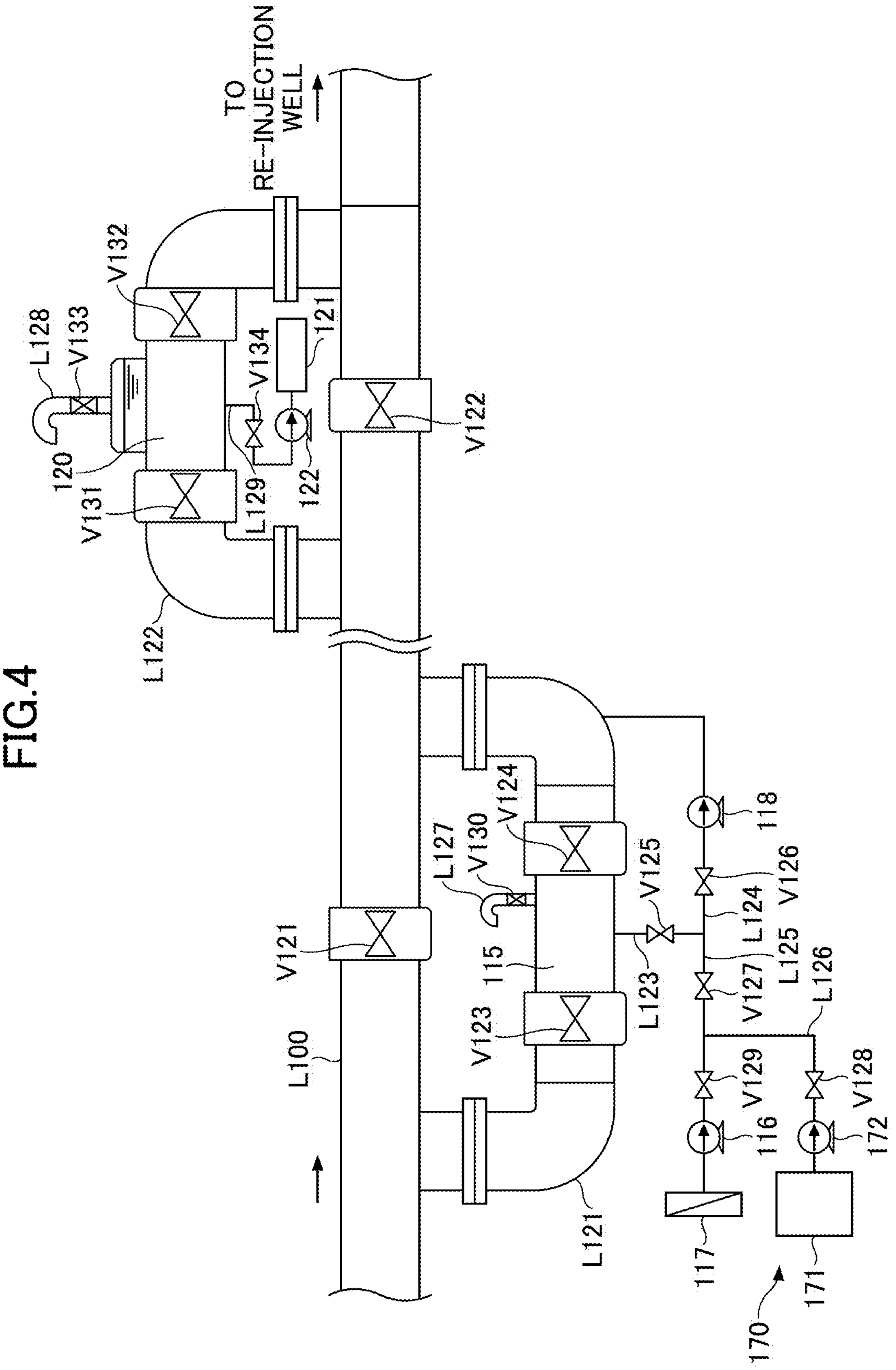
FIG. 4 is an enlarged view illustrating main components of FIG. 3.

Next, another example of the geothermal power generation system 100 will be described. Another example of the geothermal power generation system 100 is an embodiment of the geothermal power generation system 100 in which the re-injection line L100 is cleaned during ordinary operation (power generation). FIG. 3 is a schematic configurational diagram illustrating another example of the geothermal power generation system 100 according to one embodiment, and FIG. 4 is an enlarged view illustrating main components of FIG. 3. In FIGS. 3 and 4, arrows indicate fluid flows.

In addition to the above-described configuration as illustrated in FIGS. 1 and 2, the geothermal power generation system 100 may include, as illustrated in FIGS. 3 and 4, a first bypass pipe L121 branched from the re-injection line L100 and connected to the re-injection line L100 on the downstream side relative to the re-injection pump 103, and a second bypass pipe L122 branched from the re-injection line L100 and connected to the re-injection line L100 on the downstream side relative to the first bypass pipe L121. Furthermore, the geothermal power generation system 100 may include, as illustrated in FIG. 4, a first switching valve V121 provided in the re-injection line L100 and configured to switch a flow path of the re-injection line L100 to the first bypass pipe L121, and a second switching valve V122 provided in the re-injection line L100 and configured to switch the flow path of the re-injection line L100 to the second bypass pipe L122.

Furthermore, the geothermal power generation system 100 may include, as illustrated in FIG. 4, a chemical agent adjusting section 115 provided in the first bypass pipe L121, a first partition valve V123 provided in the first bypass pipe L121 on the upstream side relative to the chemical agent adjusting section 115, a second partition valve V124 provided in the first bypass pipe L121 on the downstream side relative to the chemical agent adjusting section 115, a second chemical agent adding device 170, and an air introducing device 116.

The chemical agent adjusting section 115 includes a first bypass pipe L121 disposed between the first partition valve V123 and the second partition valve V124, and includes a portion for introducing the air into the chemical agent inside the chemical agent adjusting section 115 and adjusting the chemical agent supplied to the re-injection line L100.

The second chemical agent adding device 170 injects the chemical agent into the chemical agent adjusting section 115. The second chemical agent adding device 170 may include a chemical agent tank 171 containing a chemical agent and a chemical agent injection pump 172 connected to the chemical agent tank 171 and discharging the chemical agent toward the chemical agent adjusting section 115. The number of the chemical agent tanks 171 is one in the example as illustrated in FIG. 4, but is not limited to this, and can be selected in accordance with the number of chemical agents to be used, and may be more than one. The number of the chemical agent injection pumps 172 can be selected in accordance with the number of the chemical agent tanks 171.

The chemical agent contained in the chemical agent tank 171 may be a detergent, or the detergent and a corrosive agent having corrosivity to metals of the re-injection line L100. The number of the chemical agent tanks 171 may be more than one, and when both a detergent and a corrosive agent are used as the chemical agents, the detergent and the corrosive agent are contained in separate chemical agent tanks 171.

The detergent is a chemical agent for removing and cleaning the scale adhered inside the piping of the re-injection line L100. As the detergent, a detergent similar to that in the embodiment as illustrated in FIG. 1 can be used.

The corrosive agent is a chemical agent to be circulated in the re-injection line L100 after cleaning, eluting metals of the piping of the re-injection line L100, and determining the cleaning state by the concentration of the eluted metal ions. As the corrosive agent, a corrosive agent similar to that in the embodiment as illustrated in FIG. 1 can be used.

The air introducing device 116 supplies air to the chemical agent inside the chemical agent adjusting section 115. Examples of the air introducing device 116 include an air compressor, a blower, and the like. The geothermal power generation system 100 may include an air filter 117 provided on the upstream side relative to the air introducing device 116, and a drain pump 118 configured to drain the geothermal brine in the chemical agent adjusting section 115.

The geothermal power generation system 100 may be provided with a ninth pipe L123 connected to the chemical agent adjusting section 115, a tenth pipe L124 branched from the ninth pipe L123 and connected to the first bypass pipe L121 on the downstream side relative to the second partition valve V124, an eleventh pipe L125 branched from the ninth pipe L123 and connected to an outlet of the air introducing device 116, and a twelfth pipe L126 branched from a place in the eleventh pipe L125 and connected to an outlet port of the chemical agent injection pump 172. The drain pump 118 is provided in the tenth pipe L124.

The ninth pipe L123 is provided extending downward in the vertical direction from the chemical agent adjusting section 115. The ninth pipe L123 sends the detergent and the air to the chemical agent adjusting section 115, and also sends the geothermal brine discharged from the chemical agent adjusting section 115 to the tenth pipe L124. The geothermal power generation system 100 may include a thirteenth pipe L127 connected to the chemical agent adjusting section 115 and provided extending upward in the vertical direction from the chemical agent adjusting section 115. The thirteenth pipe L127 discharges the air in the chemical agent adjusting section 115 to the outside and introduces the air into the chemical agent adjusting section 115. The geothermal power generation system 100 may include a fifteenth valve V130 provided in the thirteenth pipe L127 and configured to open and close a flow path of the thirteenth pipe L127.

The geothermal power generation system 100 may include: a seventh valve V125 provided in a ninth pipe L123 and configured to open and close a flow path of a ninth pipe L123; an eighth valve V126 provided on the upstream side relative to the drain pump 118 in a tenth pipe L124 and configured to open and close a flow path of the tenth pipe L124; a ninth valve V127 provided in the eleventh pipe L125 and configured to open and close a flow path of the eleventh pipe L125 on the downstream side relative to a branching point to the twelfth pipe L126; a tenth valve V129 configured to open and close a flow path on the upstream side relative to the branching point to the twelfth pipe L126; and an eleventh valve V128 provided on the downstream side relative to the chemical agent injection pump 172 in the twelfth pipe L126 and configured to open and close a flow path of the twelfth pipe L126.

The geothermal power generation system 100 may include an air separator 120 provided in the second bypass pipe L122, a third partition valve V131 provided in the second bypass pipe L122 on the upstream side relative to the air separator 120, a fourth partition valve V132 provided in the second bypass pipe L122 on the downstream side relative to the air separator 120, and a second liquid analyzer 121 connected to the air separator 120.

The air separator 120 includes a part configured to separate (deaerate) air from fluids (geothermal brine and chemicals) in the air separator 120. The second liquid analyzer 121 measures, for example, the pH, a dielectric constant, or a dissolved ion concentration.

The geothermal power generation system 100 may include a fourteenth pipe L128 connected to the air separator 120 and extending vertically upward, and a fifteenth pipe L129 connected to the air separator 120 and extending vertically downward. The fourteenth pipe L128 discharges air separated in the air separator 120 to the outside. The geothermal power generation system 100 may include an air vent valve V133 provided in the fourteenth pipe L128. The air vent valve V133 automatically discharges the air accumulated in the air separator 120. The fifteenth pipe L129 connects the air separator 120 and the second liquid analyzer 121, and sends the fluid in the air separator 120 to the second liquid analyzer 121. The geothermal power generation system 100 may include a liquid feed pump 122 provided in the fifteenth pipe L129 and configured to discharge fluid flowing through the fifteenth pipe L129 toward an inlet of the second liquid analyzer 121, and a twelfth valve V134 provided in the fifteenth pipe L129 on the upstream side relative to the liquid feed pump 122 and configured to open and close a flow path of the fifteenth pipe L129.

The controller 140 may switch between an injection operation and injection stoppage of the chemical agent performed by the second chemical agent adding device 170, and between allowing air introduction and stopping air introduction performed by the air introducing device 116, based on an analysis result of the second liquid analyzer 121, and may also control the first switching valve V121, the second switching valve V122, and the first to fourth partition valves V123, V124, V131, and V132.

Next, operation of the cleaning in another example of the geothermal power generation system 100 will be described in detail. FIGS. 5A to 5D are enlarged views of the main components of FIG. 3 for explaining the operation of cleaning in another example of the geothermal power generation system 100 according to one embodiment. In FIGS. 5A to 5D, open valves are illustrated in white, closed valves are illustrated in black, and arrows indicate the flow of fluid.

The controller 140 may repeat the ordinary operation, and after the ordinary operation, a draining operation for discharging the geothermal brine inside the chemical agent adjusting section 115, a chemical agent injection operation for injecting the chemical agent into the chemical agent adjusting section 115 from which the geothermal brine has been discharged, an air introduction operation for introducing air into the chemical agent injected into the chemical agent adjusting section 115, and a line switching and cleaning operation for switching the flow path of the re-injection line L100 to the first bypass pipe L121 and the second bypass pipe L122 and starting cleaning.

Figure 5A:
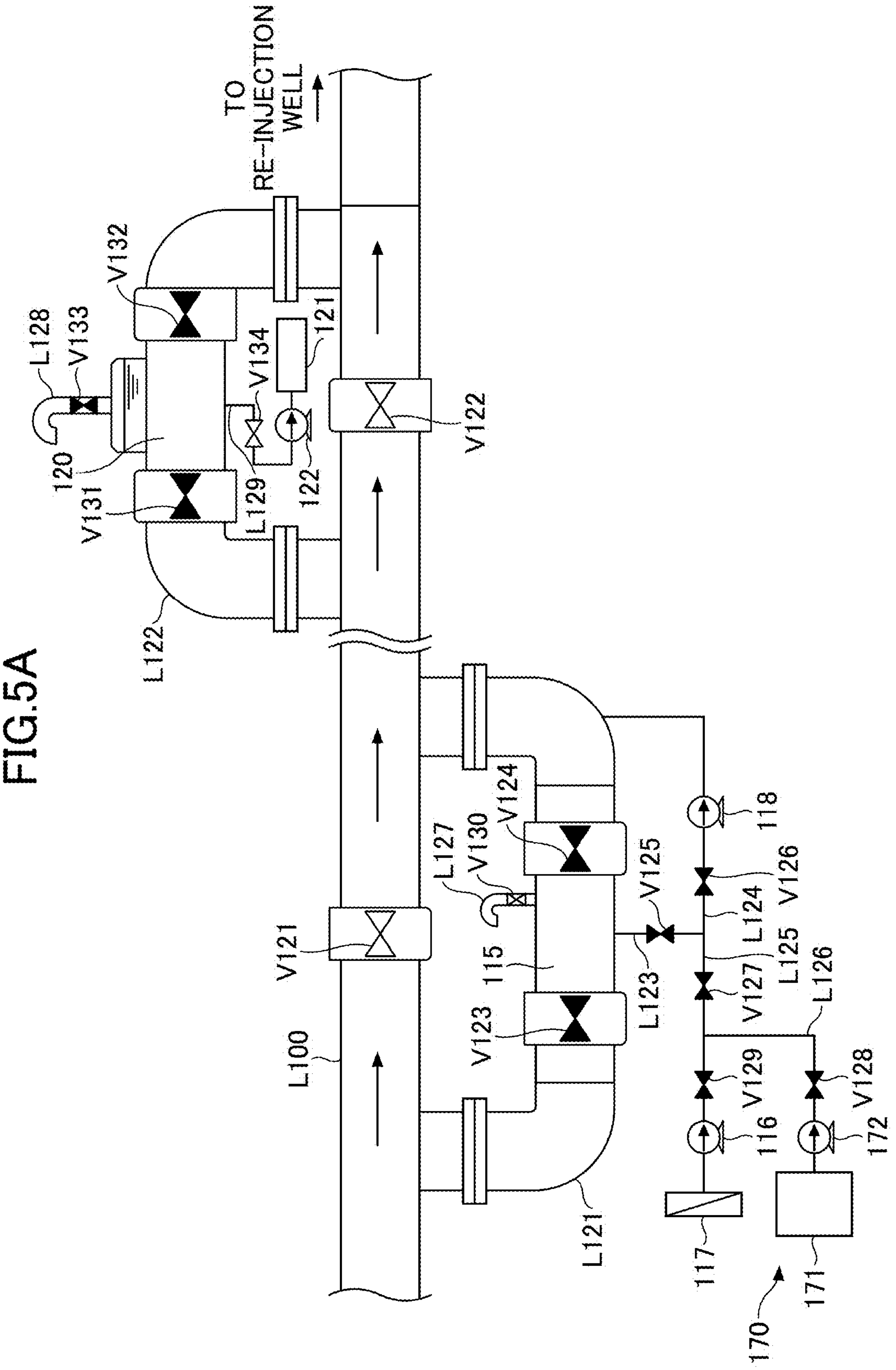
FIG. 5A is an enlarged view (part 1) illustrating the main components of FIG. 3 for explaining the operation of cleaning in another example of the geothermal power generation system according to the embodiment.

As illustrated in FIG. 5A, the controller 140 opens the first switching valve V121 and the second switching valve V122 and closes the first to fourth partition valves V123, V124, V131, and V132 in ordinary operation. In the ordinary operation, the geothermal brine flows through the re-injection line 100 and does not flow into the first bypass pipe L121 and the second bypass pipe L122.

Figure 5B:
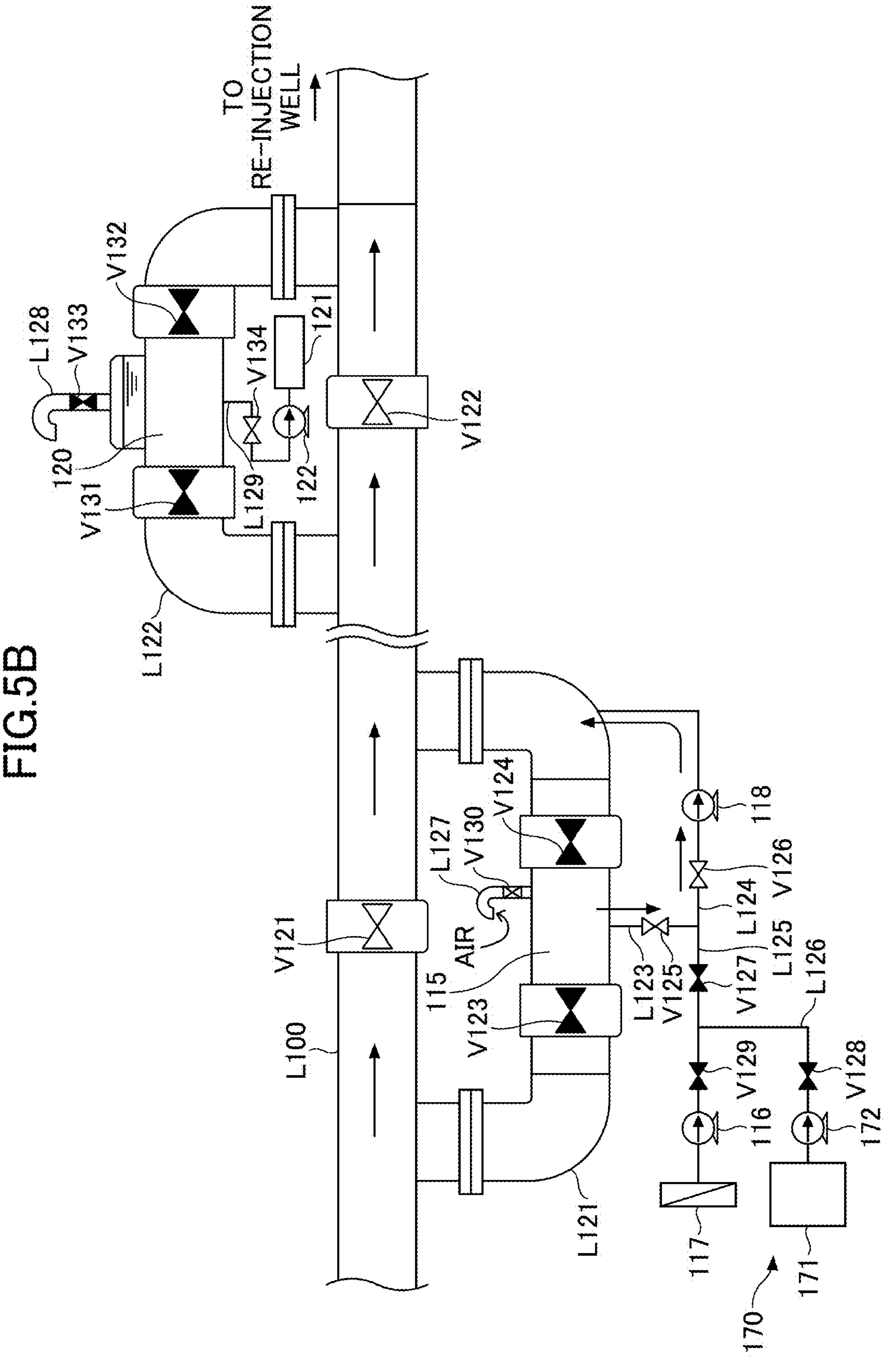
FIG. 5B is an enlarged view (part 2) illustrating the main components of FIG. 3 for explaining the operation of cleaning in the example of the geothermal power generation system according to the embodiment.

Next, as illustrated in FIG. 5B, the controller 140 opens the seventh valve V125 and the eighth valve V126 in the draining operation for discharging the geothermal brine inside the chemical agent adjusting section 115, operates the drain pump 118, discharges the geothermal brine accumulated in the chemical agent adjusting section 115, and sends it to the first bypass pipe L121 on the downstream side relative to the second partition valve V124 via the ninth pipe L123 and the tenth pipe L124. At this time, the controller 140 opens the fifteenth valve V130, drains the geothermal brine accumulated in the chemical agent adjusting section 115, and introduces air into the chemical agent adjusting section 115 via the thirteenth pipe L127.

Figure 5C:
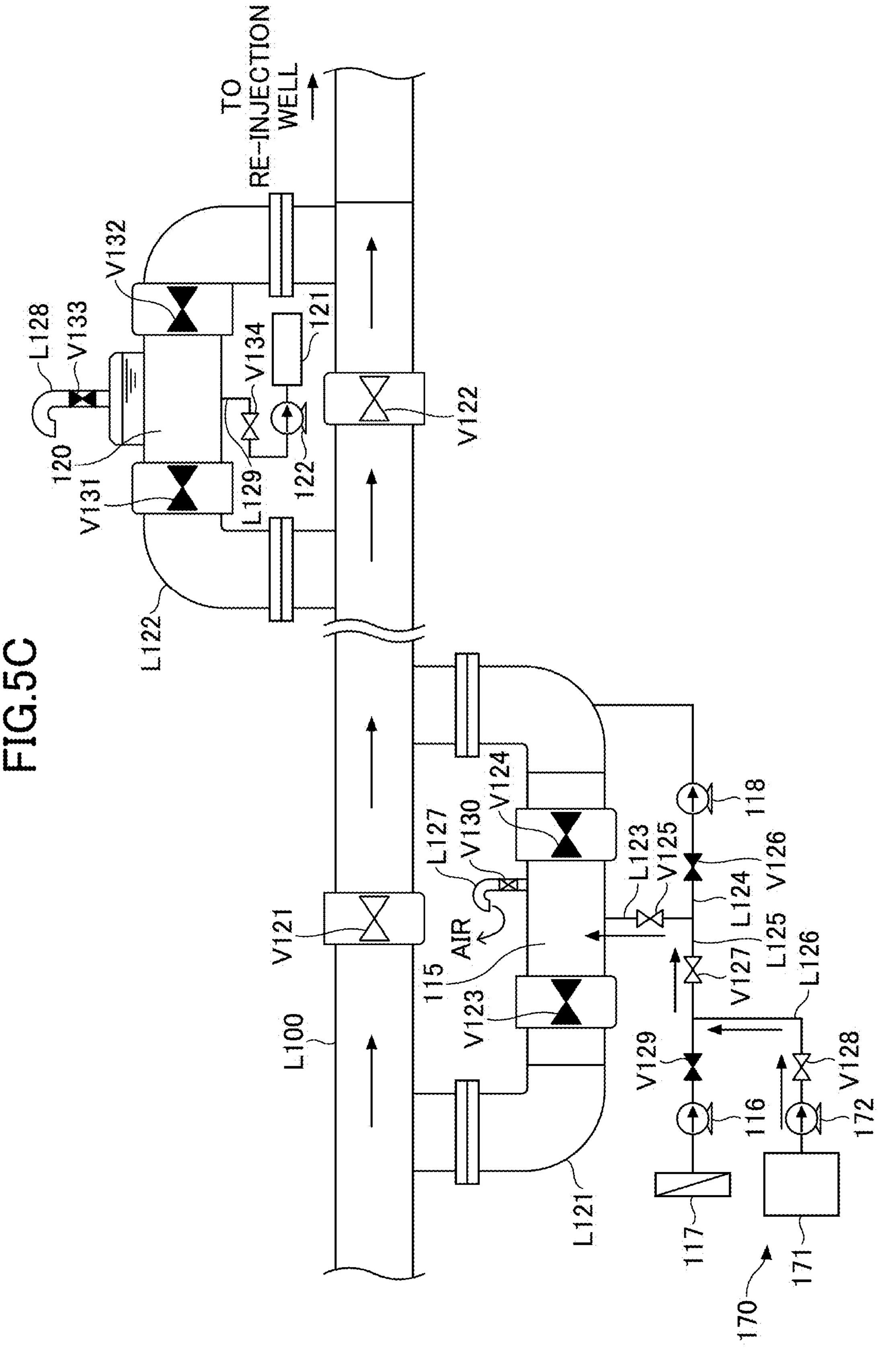
FIG. 5C is an enlarged view (part 3) illustrating the main components of FIG. 3 for explaining the operation of cleaning in the example of the geothermal power generation system according to the embodiment.

Next, as illustrated in FIG. 5C, in the chemical agent injection operation for injecting a chemical agent into the chemical agent adjusting section 115, the controller 140 closes the eighth valve V126, opens the ninth valve V127 and the eleventh valve V128 in addition to the seventh valve V125, operates the chemical agent injection pump 172, and starts injection of a chemical agent by the second chemical agent adding device 170. At this time, the chemical agent is injected into the chemical agent adjusting section 115, and the air in the chemical agent adjusting section 115 is discharged to the outside via the thirteenth pipe L127.

Figure 5D:
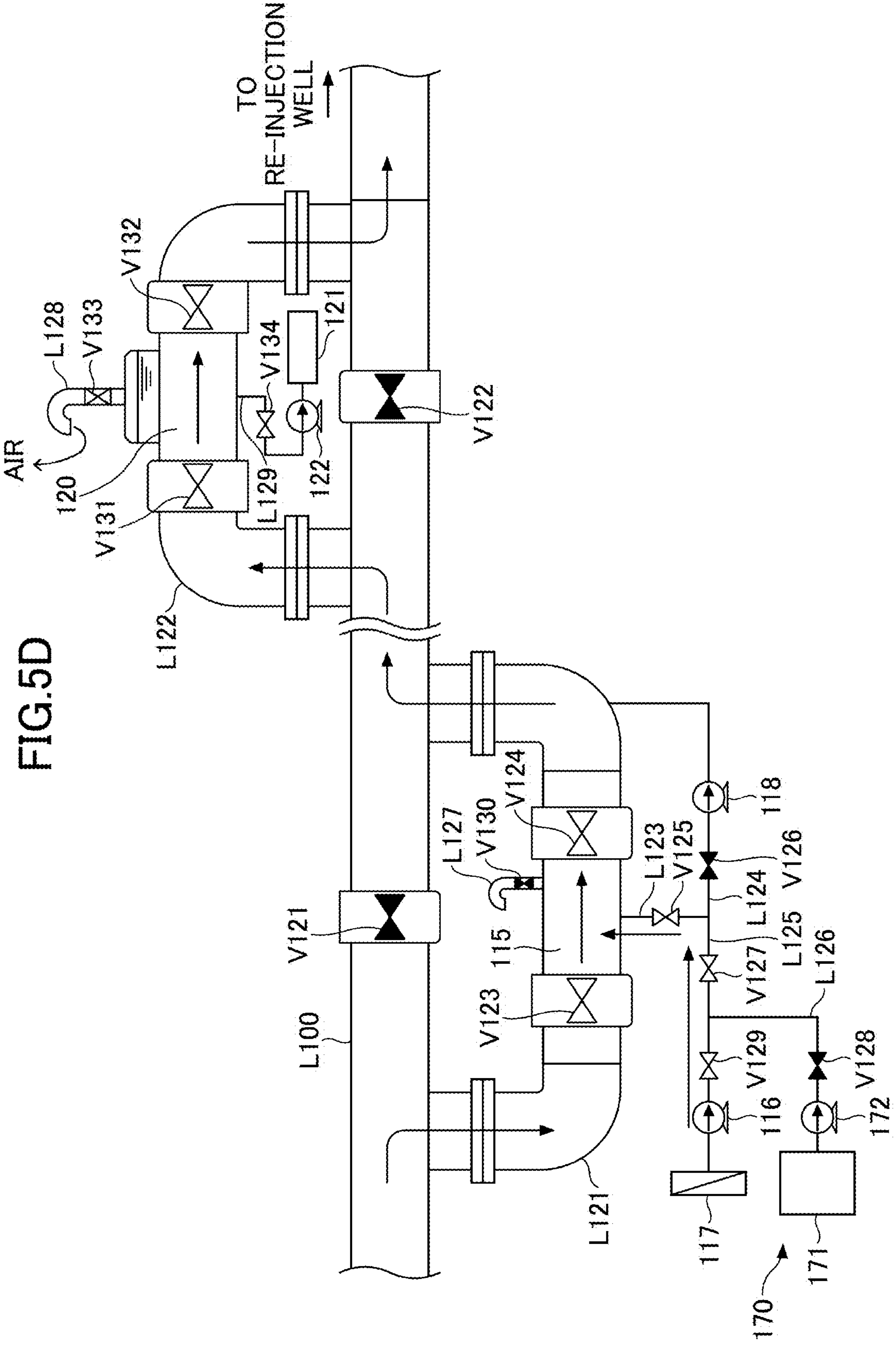
FIG. 5D is an enlarged view (part 4) illustrating the main components of FIG. 3 for explaining the operation of cleaning in the example of the geothermal power generation system according to the embodiment.

Next, as illustrated in FIG. 5D, in the air introduction operation for introducing air into the chemical agent, the controller 140 closes the eleventh valve V128 and the fifteenth valve V130, opens the tenth valve V129 in addition to the seventh valve V125 and the ninth valve V127. The controller 140 stops the chemical agent injection pump 172, stops the injection of the chemical agent by the second chemical agent adding device 170, and operates the air introducing device 116, and controls the supply of air to the chemical agent inside the chemical agent adjusting section 115 via the ninth pipe L123 and the eleventh pipe L125.

In the line switching and cleaning operation in which the flow path of the re-injection line L100 is switched to the first bypass pipe L121 and the second bypass pipe L122 and starting cleaning, the controller 140 opens the first to fourth partition valves V123, V124, V131, and V132, and switches the flow path of the re-injection line L100 to the first bypass pipe L121 and the second bypass pipe L122 to control the flow of the chemical agent containing the air inside the chemical agent adjusting section 115 to the re-injection line L100 and the second bypass pipe L122.

The air introduced into the chemical agent inside the chemical agent adjusting section 115 is discharged to the outside via the air vent valve V133 and the fourteenth pipe L128 in the air separator 120. That is, the geothermal power generation system 100 separates the air from the fluid (the fluid including the geothermal brine, the chemical agents, and the air) in the air separator 120, and then causes the fluid separated from the air to flow to the re-injection line L100 on the downstream side relative to the second bypass pipe L122.

After the line switching and cleaning operation, the controller 140 repeats the ordinary operation, the draining operation, the chemical agent injection operation, the air introduction operation, and the line switching and cleaning operation again after a predetermined time elapses.

After executing the cleaning operation, the controller 140 may determine a cleaning state based on the concentration of metal ions detected by the second liquid analyzer 121 after stopping the injection of the chemical agent by the second chemical agent adding device 170 and supplying the corrosive agent by the second chemical agent adding device 170 with the first and second switching valves V121 and V122 closed and the first to fourth partition valves V123, V124, V131, and V132 opened. The concentration of metal ions detected by the second liquid analyzer 121 may be the concentration of iron ions. For example, the controller 140 may determine that the cleaning is complete when the concentration of iron ions reaches 100 ppm. The analysis result of the analysis by the first liquid analyzer 111 may be the dielectric constant.

When the concentration of metal ions detected by the second liquid analyzer 121 is less than a specified value, the controller 140 may determine that the cleaning is not complete, and repeat the ordinary operation, the draining operation, the chemical agent injection operation, the air introduction operation, and the line switching and cleaning operation again.

The controller 140 may determine that the cleaning is complete when the concentration of metal ions detected by the second liquid analyzer 121 reaches the specified value, execute the ordinary operation, and end the execution of the subsequent chemical agent injection operation, air introduction operation, and line switching and cleaning operation.

The geothermal power generation system 100 includes the gas-liquid separator 3, the power generator 101, the retention tank 102, the re-injection line L100, the re-injection pump 103, the chemical agent injection port 104 provided in the re-injection line L100 between the retention tank 102 and the re-injection pump 103, and the first chemical agent adding device 130. The geothermal power generation system 100 also includes the branching section 110, the first liquid analyzer 111, the scale-piece collector 113 including the residue input port 113*a*, the dissolving agent injection port 113*b*, and the residue discharge port 113*c*, the dissolving agent adding device 150, and the controller 140 configured to switch between the injection operation and injection stoppage of the chemical agent performed by the first chemical agent adding device 130, and to switch between the injection operation and injection stoppage of the dissolving agent performed by the dissolving agent adding device 150 based on the analysis result of the first liquid analyzer 111.

With this configuration, the controller 140 confirms that the chemical agent has arrived at the downstream side of the re-injection line L100 based on the analysis result of the first liquid analyzer 111 provided on the downstream side of the re-injection line L100, and switches between the injection operation and injection stoppage of the chemical agent performed by the first chemical agent adding device 130. Therefore, the geothermal power generation system 100 can clean the re-injection line L100 by spreading the chemical agent from the upstream side to the downstream side of the re-injection line L100, while the geothermal power generation system 100 is in a closed state, that is, without opening or disassembling the geothermal power generation system 100. Moreover, even when the scale pieces flow through the re-injection line L100 after cleaning the re-injection line L100, the geothermal power generation system 100 collects the scale pieces by the scale-piece collector 113 and the controller 140 switches between the injection operation and injection stoppage of the dissolving agent performed by the dissolving agent adding device 150. Therefore, the geothermal power generation system 100 can dissolve and remove the scale pieces flowing through the re-injection line L100 after the cleaning, while the geothermal power generation system 100 is in the closed state, that is without opening or disassembling the geothermal power generation system 100. Thus, the geothermal power generation system 100 can sufficiently remove the scale of the re-injection line L100.

Specifically, the geothermal power generation system 100 includes the first valve V101, the first chemical agent adding device 130 includes the plurality of chemical agent tanks 131*a*, 131*b*, and 131*c* and the plurality of chemical agent injection pumps 132*a*, 132*b*, and 132*c*, and the dissolving agent adding device 150 includes the dissolving agent tank 151 and the dissolving agent injection pump 152. The controller 140 controls the plurality of chemical agent injection pumps 132*a*, 132*b*, and 132*c*, the dissolving agent injection pump 152, and the first valve V101 based on the analysis result of the first liquid analyzer 111.

With this configuration, the controller 140 selects a chemical agent corresponding to a purpose from a plurality of agents based on the analysis result of the first liquid analyzer 111 and controls the chemical agent injection pump configured to discharge the chemical agent, such that the geothermal power generation system 100 can supply the chemical agent corresponding to the purpose to the re-injection line L100. Then, by closing the first valve V101 after the controller 140 distributes the chemical agent throughout the re-injection line L100, the geothermal power generation system 100 can sufficiently cause the chemical agent to contact the inner wall of the piping of the re-injection line L100 and enhance the cleaning effect. Furthermore, the controller 140 controls the dissolving agent injection pump 152 based on the analysis result of the first liquid analyzer 111, such that the geothermal power generation system 100 can sufficiently dissolve and remove the scale pieces flowing through the re-injection line L100 after cleaning. Thus, the geothermal power generation system 100 can more fully remove the scale of the re-injection line L100.

In the geothermal power generation system 100, each of the plurality of chemical agent tanks 131*a*, 131*b*, and 131*c* contains one chemical agent selected from a group including a tracer reagent, a detergent, and a corrosive agent having corrosivity to the metals of the re-injection line L100. Thus, by supplying the tracer reagent to the re-injection line L100 at the same time as the detergent, the geothermal power generation system 100 can confirm the arrival of the detergent by the first liquid analyzer 111, and the detergent can be distributed throughout the re-injection line L100 from the upstream side to the downstream side to clean the re-injection line L100. Furthermore, by supplying the corrosive agent to the re-injection line L100, the geothermal power generation system 100 can elute the metals included in the piping of the re-injection line L100, and determine the cleaning state by the concentration of the eluted metal ions. Therefore, the geothermal power generation system 100 can more fully remove the scale of the re-injection line L100.

In the geothermal power generation system 100, the tracer reagent is preferably an aromatic sulfonate. In the geothermal power generation system 100, by supplying the aromatic sulfonate as the tracer reagent to the re-injection line L100 at the same time as the detergent, the tracer reagent can be readily detected by the first liquid analyzer 111, and the arrival of the detergent can be readily confirmed.

In the geothermal power generation system 100, the detergent includes one or more chemical agents selected from a group including an acidic agent, a basic agent, a chelating agent, a hydrogen peroxide agent, a dispersant, and a catalase agent. Thus, the geothermal power generation system 100 can supply the optimum detergent to the re-injection line L100 for each of ooze, calcium carbonate, amorphous silica, iron rust, and the like contained in the scale.

In the geothermal power generation system 100, the corrosive agent is one chemical agent selected from a group including a sulfuric acid, a hydrochloric acid, an acetic acid, and a citric acid. By supplying the one selected from the sulfuric acid, the hydrochloric acid, the acetic acid, and the citric acid as the corrosive agent to the re-injection line L100, the geothermal power generation system 100 elutes the iron included in the piping of the re-injection line L100, and determines the cleaning state based on the concentration of eluted iron ions.

In the geothermal power generation system 100, the dissolving agent is one chemical agent selected from a group including a basic agent, a fluoride agent, and an acidic agent. Thus, the geothermal power generation system 100 can supply the optimum dissolving agent for calcium carbonate, amorphous silica, and the like contained in the scale to the scale-piece collector 113.

In the geothermal power generation system 100, the controller 140 causes the first chemical agent adding device 130 to supply a detergent and at the same time, causes a tracer reagent to be supplied two or more times at an interval of 5 minutes or more, and after the first liquid analyzer 111 detects the tracer reagent as many times as the number of times the tracer reagent has been supplied, stops the supply of the detergent and closes the first valve V101 to execute a cleaning operation.

Thus, the controller 140 confirms the arrival of the detergent by the first liquid analyzer 111, allows the detergent to be distributed throughout the re-injection line L100, and then closes the first valve V101, thereby allowing the geothermal power generation system 100 to sufficiently contact the detergent with the inner wall of the piping of the re-injection line L100 to enhance the cleaning effect. Therefore, the geothermal power generation system 100 can more fully remove the scale of the re-injection line L100.

In the geothermal power generation system 100, after 2 to 3 hours have elapsed from the time when the first valve V101 is closed, the controller 140 opens the first valve V101, causes the first chemical agent adding device 130 to supply a corrosive agent, and determines a cleaning state based on the concentration of metal ions detected by the first liquid analyzer 111. Thus, the geothermal power generation system 100 can clean the re-injection line L100 according to the cleaning state, and can more fully remove the scale of the re-injection line L100.

In the geothermal power generation system 100, when the concentration of metal ions detected by the first liquid analyzer 111 is less than a specified value, the controller 140 determines that the cleaning is not completed, executes the cleaning operation again, and repeats the cleaning operation until the concentration of metal ions detected by the first liquid analyzer 111 reaches the specified value. Thus, the geothermal power generation system 100 can suppress occurrence of cleaning failure in the re-injection line L100, and can more fully remove the scale of the re-injection line L100.

The geothermal power generation system 100 includes the second valve V102 and the third valve V103, and when the concentration of metal ions detected by the first liquid analyzer 111 reaches the specified value and the controller 140 determines that the cleaning is completed, the controller 140 causes the geothermal brine to flow into the residue input port 113*a*, causes the scale-piece collector 113 to collect scale pieces, then causes the dissolving agent adding device 150 to inject a dissolving agent into the dissolving agent injection port 113*b*, and closes the second valve V102 and the third valve V103. In this way, in the case where the scale pieces flow through the re-injection line L100 after the cleaning of the re-injection line L100 is completed, the geothermal power generation system 100 can collect the scale pieces by the scale-piece collector 113, and remove the scale pieces by dissolving them. Therefore, the geothermal power generation system 100 can more fully remove the scale of the re-injection line L100.

In the geothermal power generation system 100, the controller 140 controls the flow of the fluid containing the dissolved scale pieces in the scale-piece collector to the re-injection well 4 via the first pipe L101 by closing the second valve V102 and the third valve V103, leaving the second valve V102 and the third valve V103 closed for 48 hours or more, and then opening the second valve V102. The controller 140 immerses the scale pieces collected by the scale-piece collector 113 into the dissolving agent under an environment maintained at a high temperature by receiving sensible heat of the re-injection well 4, such that the geothermal power generation system 100 can more fully dissolve and remove the scale pieces. Therefore, the geothermal power generation system 100 can more fully remove the scale of the re-injection line L100.

In the geothermal power generation system 100, the controller 140 controls the discharge of scale pieces remaining in the scale-piece collector to the outside through the residue discharge port 113*c*. Thus, the controller 140 can remove poorly soluble scale pieces that cannot be dissolved by the dissolving agent in the scale-piece collector 113.

The geothermal power generation system 100 includes the first bypass pipe L121, the second bypass pipe L122, the first switching valve V121, the second switching valve V122, the chemical agent adjusting section 115, the first partition valve V123, and the second partition valve V124, the second chemical agent adding device 170, the air introducing device 116, the air separator 120, the third partition valve V131, the fourth partition valve V132, and the second liquid analyzer 121. Based on the analysis result of the second liquid analyzer 121, the controller 140 switches between the injection operation and injection stoppage of the chemical agent performed by the second chemical agent adding device 170, switches between allowing air introduction and stopping air introduction performed by the air introducing device 116, and controls the first switching valve V121, the second switching valve V122, and the first to fourth partition valves V123, V124, V131, and V132.

With this configuration, the geothermal power generation system 100 can clean the re-injection line L100 even during ordinary operation (power generation). The controller 140 introduces air to the chemical agent supplied by the second chemical agent adding device 170 by the air introducing device 116. Then, by controlling the first switching valve V121, the second switching valve V122, and the first to fourth partition valves V123, V124, V131, and V132, the controller 140 switches the flow path of the re-injection line L100 to the first bypass pipe L121 and the second bypass pipe L122, and distributes the chemical agent with air introduced thereto to the re-injection line L100. Thus, a contact area between the chemical agent and the geothermal brine can be reduced, and therefore the chemical can be suppressed from being diluted while flowing through the re-injection line L100. Moreover, the controller 140 can determine the cleaning state based on the concentration of metal ions detected by the second liquid analyzer 121 by supplying the corrosive agent by the second chemical agent adding device 170. Therefore, the geothermal power generation system 100 can perform cleaning until the re-injection line L100 is sufficiently cleaned. Thus, the geothermal power generation system 100 can sufficiently remove the scale of the re-injection line L100 even during an ordinary operation.

In the geothermal power generation system 100, the controller 140 repeats: the ordinary operation; as well as, after the ordinary operation, the draining operation for discharging the geothermal brine inside the chemical agent adjusting section 115; the chemical agent injection operation for injecting a chemical agent into the chemical agent adjusting section 115 from which the geothermal brine has been discharged; the air introduction operation for introducing air into the chemical agent injected into the chemical agent adjusting section 115; and the line switching and cleaning operation for switching the flow path of the re-injection line L100 to the first bypass pipe L121 and the second bypass pipe L122 and starting cleaning. As a result, the chemical agent containing the air is repeatedly supplied to the geothermal brine in the re-injection line L100, and the air surrounding the chemical agent becomes a barrier, making it difficult for the chemical agent to diffuse into the geothermal brine, such that the geothermal power generation system 100 can further suppress the chemical agent from being diluted while flowing through the re-injection line L100.

After separating the air from the fluid inside the air separator 120, the geothermal power generation system 100 distributes the fluid separated from the air to the re-injection line L100 on the downstream side relative to the second bypass pipe L122. As a result, the geothermal power generation system 100 can maintain the permeability of the geothermal brine returned to the re-injection well 4 via the re-injection line L100 on the downstream side relative to the second bypass pipe L122.

The geothermal power generation system according to an embodiment of the present disclosure can remove the scale in the re-injection line sufficiently.

Although the embodiments have been described above, the above embodiments are presented as examples, and the present invention is not limited by the above embodiments. The above embodiments can be implemented in various other forms, and various combinations, omissions, substitutions, changes, and the like can be made without departing from the gist of the invention. These embodiments and variations thereof are included in the scope and gist of the invention, as well as in the scope and equivalence of the claimed invention.

What is claimed is:

1. A geothermal power generation system, comprising:

a gas-liquid separator configured to separate geothermal brine and geothermal steam from a geothermal fluid spouted out from a production well;

a power generator configured to generate power by using the geothermal brine or the geothermal steam separated by the gas-liquid separator as a heat source;

a retention tank configured to store the geothermal brine from which heat has been recovered by the power generator;

a re-injection line configured to connect an outlet portion of the retention tank and a re-injection well;

a re-injection pump provided in the re-injection line and configured to return the geothermal brine discharged from the retention tank to the re-injection well;

a chemical agent injection port provided in the re-injection line between the retention tank and the re-injection pump;

a first chemical agent adding device configured to inject a chemical agent into the chemical agent injection port;

a branching section provided in the re-injection line on a downstream side relative to the re-injection pump as well as on an upper side in a vertical direction of the re-injection well, and configured to branch a flow of the geothermal brine;

a first liquid analyzer connected vertically upward from the branching section;

a scale-piece collector connected horizontally from the branching section and provided with a residue input port, a dissolving agent injection port, and a residue discharge port;

a dissolving agent adding device configured to inject a dissolving agent into the dissolving agent injection port; and a controller configured to switch between an injection operation and injection stoppage of the chemical agent performed by the first chemical agent adding device and to switch between an injection operation and injection stoppage of the dissolving agent performed by the dissolving agent adding device, based on an analysis result of the first liquid analyzer.

2. The geothermal power generation system according to claim 1, further comprising:

a first valve provided in the re-injection line between the branching section and the re-injection well and configured to open and close a flow path between the branching section and the re-injection well, wherein the first chemical agent adding device includes a plurality of chemical agent tanks that respectively contain the chemical agent, and a plurality of chemical agent injection pumps, each of the injection pumps connected to a corresponding one of the plurality of chemical agent tanks, each of the injection pumps configured to discharge the chemical agent toward the chemical agent injection port, the dissolving agent adding device includes a dissolving agent tank containing the dissolving agent, and a dissolving agent injection pump connected to the dissolving agent tank and configured to discharge the dissolving agent toward the dissolving agent injection port, and the controller controls, based on the analysis result of the first liquid analyzer, the plurality of chemical agent injection pumps, the dissolving agent injection pump, and the first valve.

3. The geothermal power generation system according to claim 2, wherein the plurality of chemical agent tanks contain, respectively, a tracer reagent, a detergent, and a corrosive agent having a corrosive effect on a metal included in the re-injection line.

4. The geothermal power generation system according to claim 3, wherein the tracer reagent is aromatic sulfonate.

5. The geothermal power generation system according to claim 3, wherein the detergent includes one or more chemical agents selected from a group consisting of an acidic agent, a basic agent, a chelating agent, a hydrogen peroxide agent, a dispersant, and a catalase agent.

6. The geothermal power generation system according to claim 3, wherein the corrosive agent is an acid selected from a group consisting of a sulfuric acid, a hydrochloric acid, an acetic acid, and a citric acid.

7. The geothermal power generation system according to claim 1, wherein the dissolving agent is a chemical agent selected from a group consisting of a basic agent, a fluoride agent, and an acidic agent.

8. The geothermal power generation system according to claim 3, wherein the controller is configured to execute a cleaning operation by supplying the detergent with the first chemical agent adding device and supplying the tracer reagent two or more times at an interval of 5 minutes or more, and after the first liquid analyzer detects the tracer reagent as many times as a number of times the tracer reagent has been supplied, stopping the supply of the detergent and closing the first valve.

9. The geothermal power generation system according to claim 8, wherein the controller is configured to open the first valve after 2 to 3 hours have elapsed from a time the first valve is closed, cause the first chemical agent adding device to supply the corrosive agent, and determine a cleaning state based on a concentration of metal ions detected by the first liquid analyzer.

10. The geothermal power generation system according to claim 9, wherein upon detection of the concentration of metal ions by the first liquid analyzer being less than a specified value, the controller determines that cleaning is not complete, executes the cleaning operation again, and repeats the cleaning operation until the concentration of metal ions detected by the first liquid analyzer reaches the specified value.

11. The geothermal power generation system according to claim 10, further comprising:

a second valve provided in a first pipe connecting the branching section and the residue input port and configured to open and close a flow path of the first pipe; and a third valve provided in a second pipe connecting the dissolving agent injection port and an outlet port of the dissolving agent injection pump and configured to open and close a flow path of the second pipe, wherein the controller, in conjunction with the concentration of metal ions detected by the first liquid analyzer reaching the specified value and determining that the cleaning is completed, causes the geothermal brine to flow into the residue input port, causes the scale-piece collector to collect scale pieces, and then causes the dissolving agent adding device to inject the dissolving agent into the dissolving agent injection port, and closes the second valve and the third valve.

12. The geothermal power generation system according to claim 11, wherein the controller controls a flow of a fluid containing dissolved scale pieces in the scale-piece collector to the re-injection well via the first pipe by closing the second valve and the third valve, leaving the second valve and the third valve closed for 48 hours or more, and then opening the second valve.

13. The geothermal power generation system according to claim 12, wherein the controller controls discharge of the scale pieces remaining in the scale-piece collector to outside through the residue discharge port.

14. The geothermal power generation system according to claim 1, further comprising:

a first bypass pipe branched from the re-injection line and connected to the re-injection line on the downstream side relative to the re-injection pump;

a second bypass pipe branched from the re-injection line and connected to the re-injection line on the downstream side relative to the first bypass pipe;

a first switching valve provided in the re-injection line and configured to switch a flow path of the re-injection line to the first bypass pipe;

a second switching valve provided in the re-injection line and configured to switch the flow path of the re-injection line to the second bypass pipe;

a chemical agent adjusting section provided in the first bypass pipe, a first partition valve provided in the first bypass pipe on an upstream side relative to the chemical agent adjusting section, and a second partition valve provided in the first bypass pipe on the downstream side relative to the chemical agent adjusting section;

a second chemical agent adding device configured to inject the chemical agent into the chemical agent adjusting section;

an air introducing device configured to supply air to the chemical agent inside the chemical agent adjusting section;

an air separator provided in the second bypass pipe, a third partition valve provided in the second bypass pipe on the upstream side relative to the air separator, and a fourth partition valve provided in the second bypass pipe on the downstream side relative to the air separator; and a second liquid analyzer connected to the air separator, wherein the controller is configured to, based on the analysis result of the second liquid analyzer, switch between the injection operation and injection stoppage of the chemical agent performed by the second chemical agent adding device, switch between allowing air introduction and stopping air introduction performed by the air introducing device, and control the first switching valve, the second switching valve, and the first partition valve to the fourth partition valve.

15. The geothermal power generation system according to claim 14, wherein the controller is configured to repeat ordinary operation, and after the ordinary operation, a draining operation for discharging the geothermal brine inside the chemical agent adjusting section, a chemical agent injection operation for injecting the chemical agent into the chemical agent adjusting section from which the geothermal brine has been discharged, an air introduction operation for introducing the air into the chemical agent injected into the chemical agent adjusting section, and a line switching and cleaning operation for switching the flow path of the re-injection line to the first bypass pipe and the second bypass pipe and starting cleaning.

16. The geothermal power generation system according to claim 15, wherein after the air is separated from the fluid inside the air separator, the fluid separated from the air is distributed in the re-injection line on the downstream side relative to the second bypass pipe.

* * * * *